(12) United States Patent
Borchert et al.

(10) Patent No.: US 8,888,874 B1
(45) Date of Patent: Nov. 18, 2014

(54) MOBILE HORIZONTAL GASIFIER SYSTEM

(75) Inventors: Curtis Borchert, Ada, MN (US); Brian Borgen, Hendrum, MN (US); Noah Storslee, Ada, MN (US)

(73) Assignee: Char Energy, LLC, Ada, MN (US)

(*) Notice: Subject to any disclaimer, the term of this patent is extended or adjusted under 35 U.S.C. 154(b) by 533 days.

(21) Appl. No.: 13/401,984

(22) Filed: Feb. 22, 2012

Related U.S. Application Data

(60) Provisional application No. 61/446,340, filed on Feb. 24, 2011.

(51) Int. Cl.
   *B01J 7/00* (2006.01)

(52) U.S. Cl.
   USPC .................................................. 48/61

(58) Field of Classification Search
   CPC ........ C10B 47/44; C10B 53/02; C10B 53/00; C10B 7/10; C10B 47/30; C10B 53/04; C10B 53/07; C10B 49/16; C10B 51/00; C10B 57/02; Y02E 50/14; Y02E 50/10; Y02E 50/30
   See application file for complete search history.

(56) References Cited

U.S. PATENT DOCUMENTS

| | | | |
|---|---|---|---|
| 3,966,634 A | 6/1976 | Sacks | |
| 4,123,332 A * | 10/1978 | Rotter | 201/15 |
| 4,147,593 A | 4/1979 | Frischmuth | |
| 5,129,995 A * | 7/1992 | Agarwal | 201/21 |
| 6,133,328 A | 10/2000 | Lightner | |
| 6,767,375 B1 | 7/2004 | Pearson | |
| 6,807,916 B2 | 10/2004 | Nunemacher | |
| 7,658,776 B1 | 2/2010 | Pearson | |
| 7,749,359 B2 | 7/2010 | Flottvik | |
| 7,833,512 B2 | 11/2010 | Pulkrabek | |
| 2007/0261948 A1 | 11/2007 | Jacobsen | |
| 2008/0286175 A1 | 11/2008 | Manning | |
| 2008/0286557 A1 * | 11/2008 | Tucker | 428/318.4 |
| 2009/0203119 A1 | 8/2009 | Evans | |
| 2009/0305355 A1 | 12/2009 | Henriksen | |
| 2010/0015841 A1 | 1/2010 | Bolik | |
| 2010/0275514 A1 | 11/2010 | Paganessi | |
| 2011/0067991 A1 * | 3/2011 | Hornung et al. | 201/32 |
| 2011/0114144 A1 * | 5/2011 | Green et al. | 136/201 |
| 2011/0136971 A1 * | 6/2011 | Tucker | 524/587 |

* cited by examiner

*Primary Examiner* — Imran Akram
(74) *Attorney, Agent, or Firm* — Neustel Law Offices

(57) ABSTRACT

A mobile horizontal gasifier system for the efficient gasification of organic material to produce syngas and biochar without a large amount of ash or other byproducts. The gasifier system generally includes a hopper, vertical feeder, horizontal transfer members and a heating chamber. Biomass fed into the hopper and feeder is conveyed through each of the transfer members by drive assembles. The transfer members extend through the heating chamber and biomass will be baked to produce both syngas and biochar. A portion of the syngas produced will be reintroduced into the heating chamber via syngas return lines so that the present invention may be self-sustaining. Syngas ports and a biochar collection chamber are provided for separating and extracting any produced syngas and/or biochar. All components are generally positioned on a mobile trailer having a hitch to allow the present invention to be easily transferred from one location to another.

17 Claims, 4 Drawing Sheets

MOBILE HORIZONTAL GASIFIER SYSTEM

CROSS REFERENCE TO RELATED APPLICATIONS

I hereby claim benefit under Title 35, United States Code, Section 119(e) of U.S. provisional patent application Ser. No. 61/446,340 filed Feb. 24, 2011. The 61/446,340 application is currently pending. The 61/446,340 application is hereby incorporated by reference into this application.

STATEMENT REGARDING FEDERALLY SPONSORED RESEARCH OR DEVELOPMENT

Not applicable to this application.

BACKGROUND OF THE INVENTION

1. Field of the Invention

The present invention relates generally to a gasifier system and more specifically it relates to a mobile horizontal gasifier system for the efficient gasification of organic material to produce syngas, biochar and excess heat without creation of a large amount of ash or other byproducts.

2. Description of the Related Art

Any discussion of the related art throughout the specification should in no way be considered as an admission that such related art is widely known or forms part of common general knowledge in the field.

Gasification has been used for many years in the production of heat, electricity, fuel and energy. Previous gasification systems have generally involved the burning of organic material in the absence of oxygen by means of such methods as historic updraft, downdraft, fluid bed processes or a single batch microwave gasifier. Such prior art systems generally suffer from the shortcoming of ash being present in both the produced biochar and syngas due to the burning of organic feed stock.

Further, existing systems which utilize vertical and gravity feeding of material suffer from difficulty in controlling heat with pyrolysis occurring at the point where material is being burned. Additionally, the pyrolysis point in prior art systems is generally limited to a small section of the gasifier chamber, which limits the size and functionality of the system overall. Finally, prior art systems require very controlled management of the moisture content of fed materials.

Because of the inherent problems with the related art, there is a need for a new and improved mobile horizontal gasifier system for the efficient gasification of organic material to produce syngas, biochar and excess heat without creation of a large amount of ash or other byproducts.

BRIEF SUMMARY OF THE INVENTION

The invention generally relates to a mobile horizontal gasifier system which includes a biomass hopper, vertical biomass feeder, horizontal transfer members and a heating chamber. Biomass will be fed into the hopper and feeder and then conveyed through each of the transfer members by one or more drive assembles. The transfer members will extend horizontally through the heating chamber, wherein any biomass stored thereon will be baked to produce both syngas and biochar. A portion of the syngas produced by the present invention will be reintroduced into the heating chamber via one or more syngas return lines so as to allow the present invention to be self-sustaining Syngas ports and a biochar collection chamber are provided for separating and extracting any produced syngas and/or biochar. All components of the present invention are generally positioned on a mobile trailer having a hitch to allow the present invention to be easily transferred from one location to another.

There has thus been outlined, rather broadly, some of the features of the invention in order that the detailed description thereof may be better understood, and in order that the present contribution to the art may be better appreciated. There are additional features of the invention that will be described hereinafter and that will form the subject matter of the claims appended hereto. In this respect, before explaining at least one embodiment of the invention in detail, it is to be understood that the invention is not limited in its application to the details of construction or to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF THE INVENTION

A. Overview.

Figure 1:
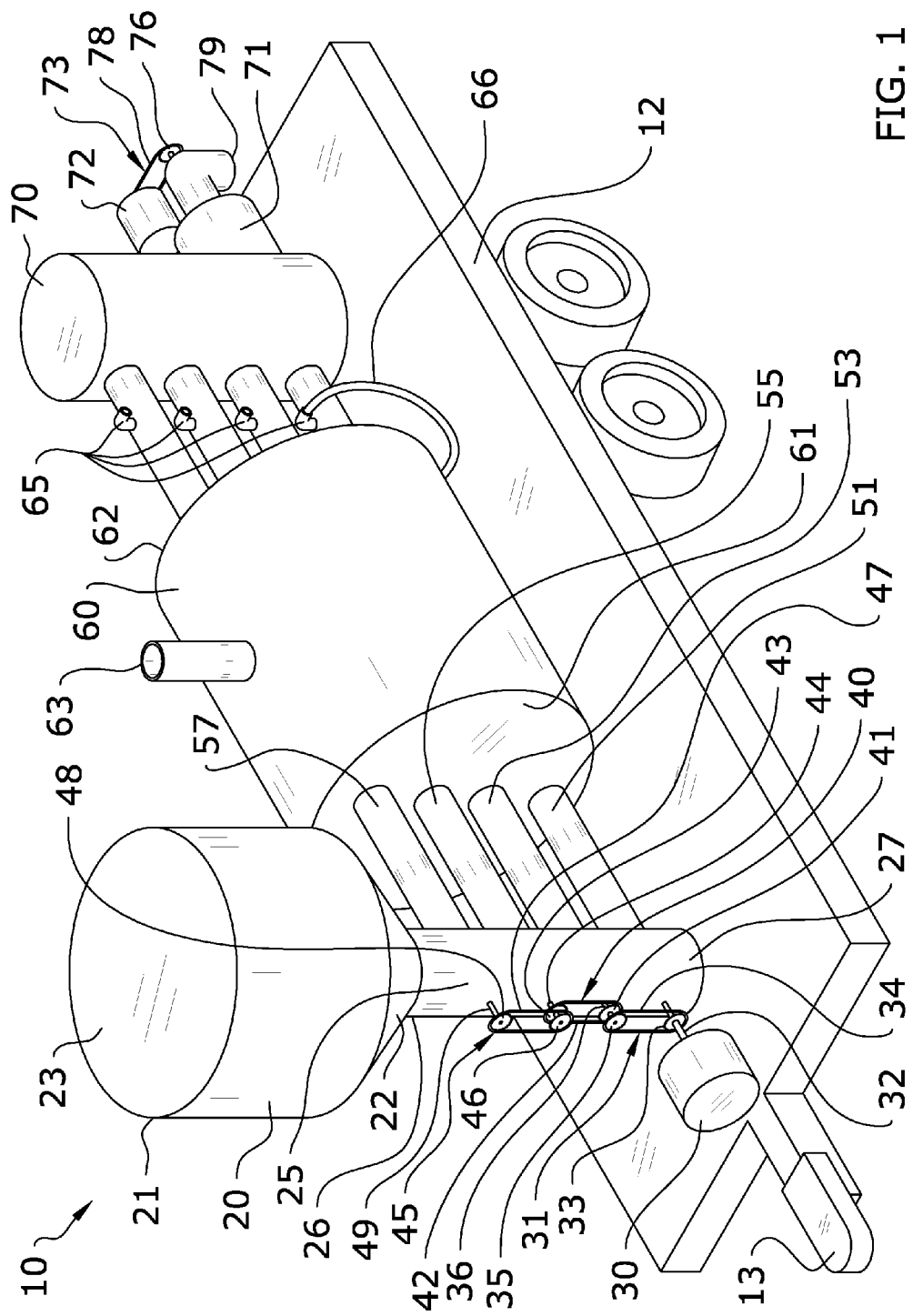
FIG. 1 is an upper perspective view of the present invention.
Figure 2:
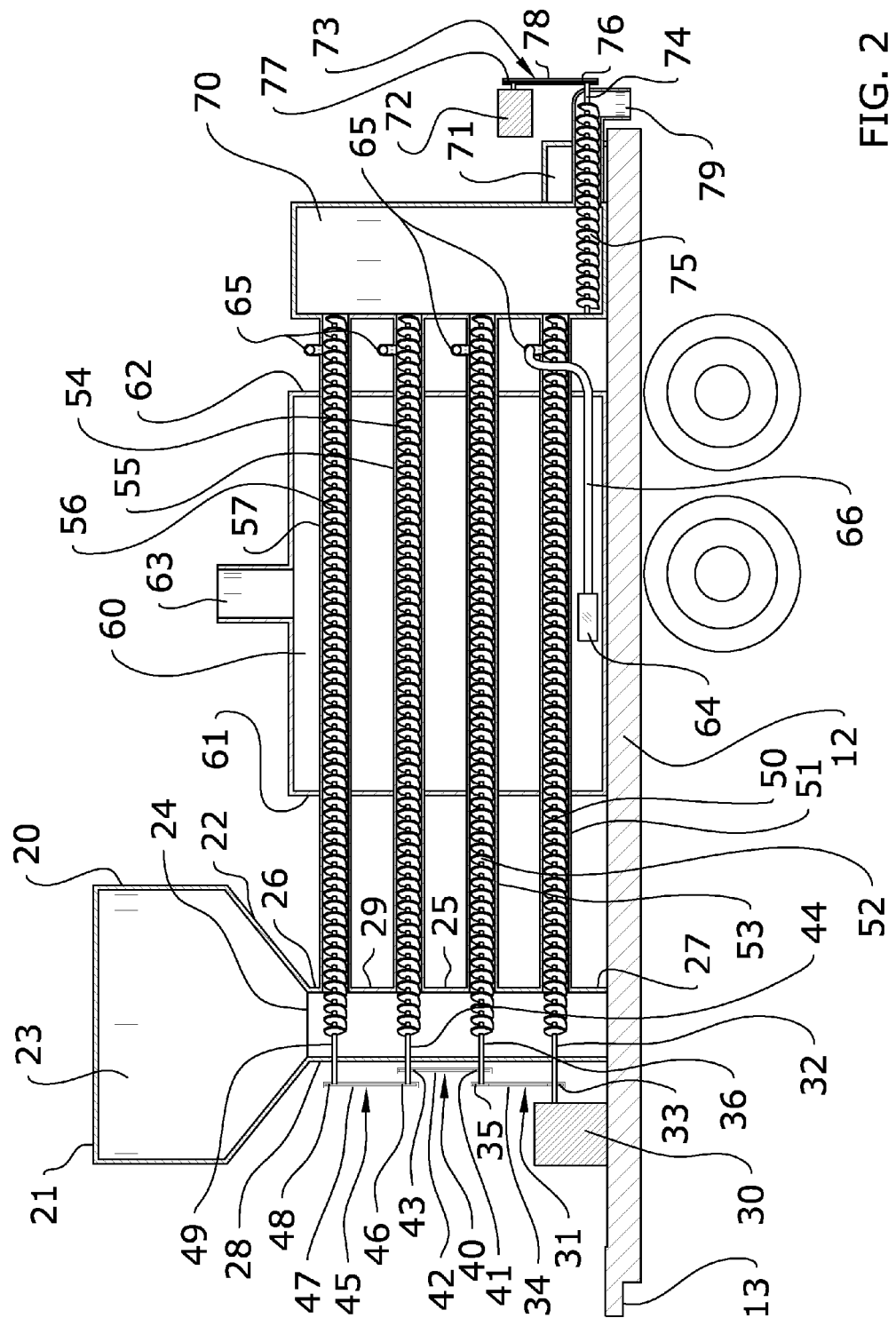
FIG. 2 is a side sectional view of the present invention.
Figure 3:
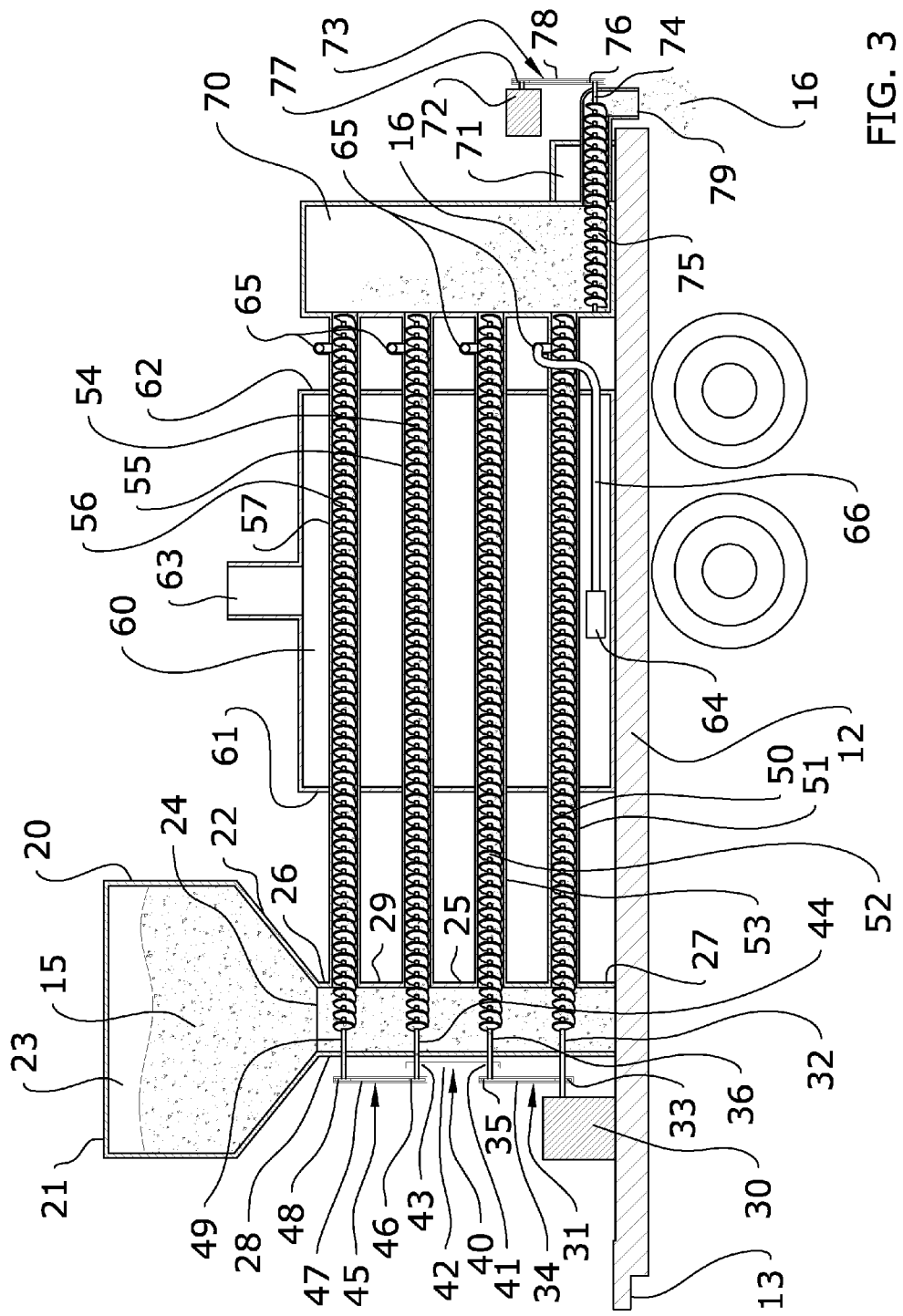
FIG. 3 is a side sectional view of the present invention in use.
Figure 4:
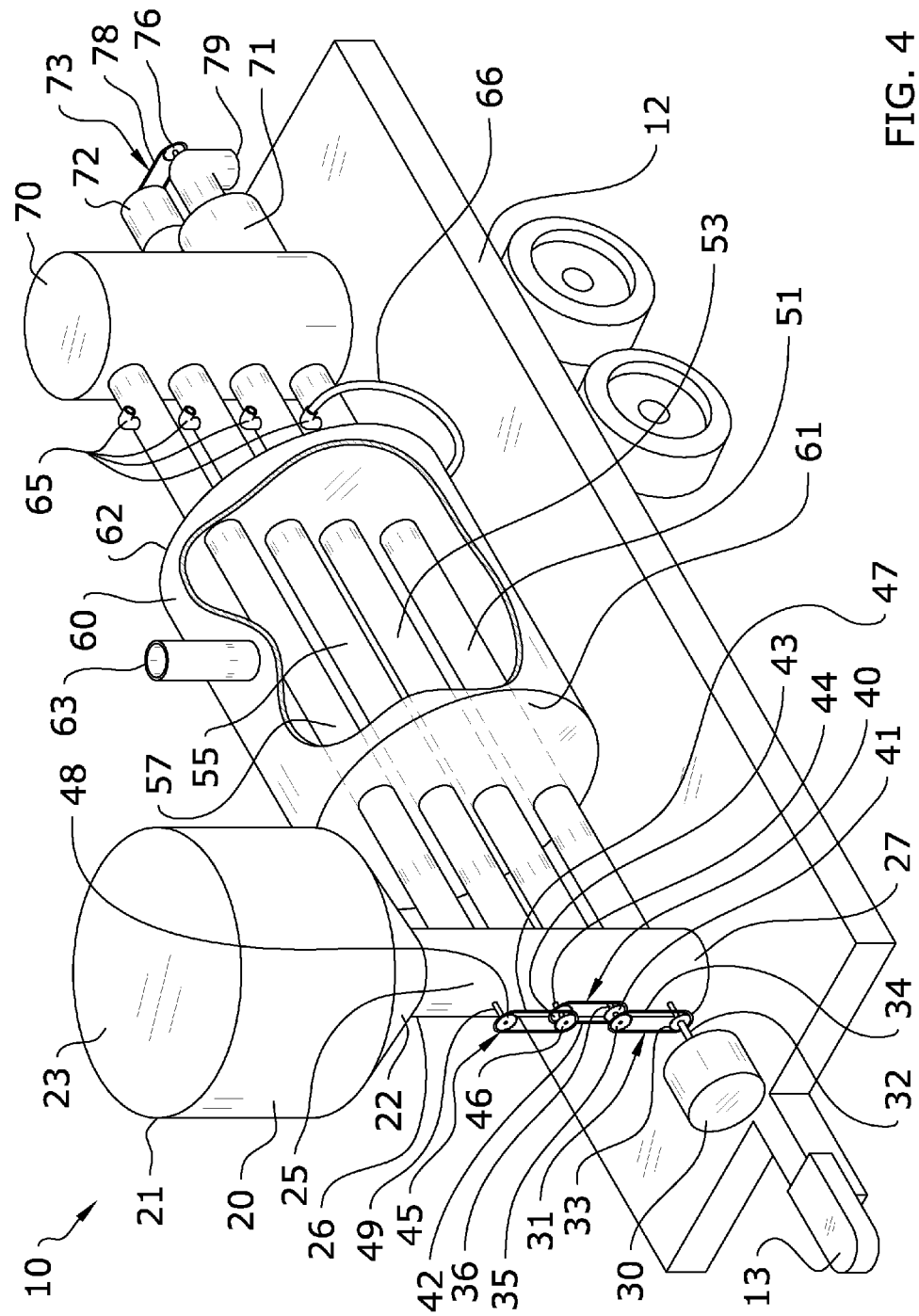
FIG. 4 is an upper perspective view illustrating a cutaway view of the interior of the heating chamber of the present invention.

Turning now descriptively to the drawings, in which similar reference characters denote similar elements throughout the several views, FIGS. 1 through 3 illustrate a mobile horizontal gasifier system 10, which comprises a biomass hopper 20, vertical biomass feeder 25, horizontal transfer members 50, 52, 54, 56 and a heating chamber 60. Biomass 15 will be fed into the hopper 20 and feeder 25 and then conveyed through each of the transfer members 50, 52, 54, 56 by one or more drive assembles 31, 40, 45. The transfer members 50, 52, 54, 56 will extend horizontally through the heating chamber 60, wherein any biomass 15 stored thereon will be baked to produce both syngas and biochar 16. A portion of the syngas produced by the present invention will be reintroduced into the heating chamber 60 via one or more syngas return lines 66 so as to allow the present invention to be self-sustaining Syngas ports 65 and a biochar collection chamber 70 are provided for separating and extracting any produced syngas and/or biochar. All components of the present invention are generally positioned on a mobile trailer 12 having a hitch 13 to allow the present invention to be easily transferred from one location to another.

B. Biomass Storage and Feeder.

As shown in FIG. 1, the present invention will generally utilize a hopper for storing and feeding large quantities of biomass 15. The hopper 20 may be comprised of various configurations known in the art, and thus should not be construed as being limited to the particular shape or configuration shown in the exemplary figures. The hopper 20 will generally be tapered inward from its upper end 21 to its lower end 22. The upper end 21 of the hopper 20 includes an upper opening 23 through which biomass 15 may be introduced. The lower end 22 of the hopper 20 includes a lower opening 24 which leads to a feeder 25. The lower opening 24 of the hopper 20 may have a smaller diameter than the upper opening 23 of the hopper 20.

It is appreciated that the hopper 20 may be comprised of various sizes depending on the needs of the operator of the present invention. Large volume hoppers 20 may be utilized with the present invention because of its use of baking as opposed to the typical burning of biomass 15. Because the present invention bakes biomass 15 instead of directly burning it, there is less chance of unintentional burning of biomass stored within the hopper 20 when the gasification process is stopped for any reason. Large quantities of biomass may be stored within the hopper 20 between production runs so that the hopper 20 need not be constantly loaded and/or unloaded whenever the present invention is activated or deactivated.

The feeder 25 of the present invention is utilized for transferring biomass 15 from the hopper 20 to the one or more feeders 51, 53, 55, 57 of the present invention. In some embodiments, the feeder 25 may be omitted entirely and the hopper 20 may feed the one or more transfer members 50 directly. In other embodiments, the hopper 20 and the feeder 25 may be integrally formed of a unitary structure.

As shown in FIG. 2, the upper end 26 of the feeder 25 is fluidly connected with the lower opening 24 of the hopper 20 so as to allow biomass 15 to freely pass therethrough. The lower end 27 of the feeder 25 may be positioned on a trailer 12 or other surface and is preferably enclosed. As best shown in FIG. 1, the one or more driver assemblies 31, 40, 45 will preferably be positioned on a first side 28 of the feeder 20. The one or more drive shafts 32, 36, 44, 49 of the present invention will preferably extend through both the first side 28 and the second side 29 of the feeder 25 as shown in FIG. 2.

C. Drive Assemblies and Transfer Members.

The present invention includes one or more drive assemblies 31, 40, 45 which are utilized to provide the force necessary for biomass 15 to traverse one or more transfer members 50, 52, 54, 56. As best shown in FIG. 2, each of the transfer members 50, 52, 54, 56 will link the feeder 25 with the collection chamber 70 by passing through the heating chamber 60. Preferably, at least a quarter of the overall length of each transfer member 50, 52, 54, 56 will separate the feeder 25 from the heating chamber 60 so as to prevent accidental burning of biomass 15 stored within the feeder 25 and hopper 20 by the heating chamber 60.

The transfer members 50, 52, 54, 56 may be comprised of various configurations, but will generally be comprised of an open vent, tube, pipe or other conduit for handling biomass 15 of different sizes. Preferable, each transfer member 50, 52, 54, 56 will be configured such that no flame from the heating chamber 60 directly contacts the biomass 15 passing therethrough. Although the figures illustrate the use of four transfer members 50, 52, 54, 56, it is appreciated that more or less transfer members 50, 52, 54, 56 may be utilized with the present invention for different applications.

Each of the transfer members 50, 52, 54, 56 includes a drive shaft 32, 36, 44, 49 passing therethrough. Each drive shaft 32, 36, 44, 49 is generally comprised of a rod or other elongated member which extends through a corresponding transfer member 50, 52, 54, 56. It is appreciated that the number of drive shafts 32, 36, 44, 49 utilized with the present invention will vary for different applications, and thus the scope of the present invention should not be construed as being limited to the exemplary configuration shown in the figures.

Each drive shaft 32, 36, 44, 49 will preferably include a conveying member 51, 53, 55, 57 thereon, such as an auger flighting or other structure which acts in connection with the rotating drive shaft 32, 36, 44, 49 to convey biomass 15 through each of the transfer members 50, 52, 54, 56.

Rotational force is transferred to each of the drive shafts 32, 36, 44, 49 with use of a drive controller 30 in combination with one or more drive assemblies 31, 40, 45, 49. The drive controller 30 will generally be comprised of a motor or other device which may provide rotational force for use with the present invention. The drive controller 30 may be linked directly only to the first drive shaft 32 or, in alternate embodiments, may be separately linked to each drive shaft 32, 36, 44, 49. By configuring the drive assemblies 31, 40, 45, 49 in series with respect to each other failure of one drive assembly 31, 40, 45, 49 will not affect the operation of the others.

While various configurations may be utilized for the drive assemblies 31, 40, 45, 49 of the present invention, a preferred configuration is shown in FIG. 1. As shown in FIG. 1, a first drive assembly 31 is linked to the drive controller 30 through its first drive shaft 32. A first sprocket 33 is fixedly secured to the first drive shaft 32 and a second sprocket 35 is fixedly secured to the second drive shaft 36, which is positioned directly above the first sprocket 33 such that the sprockets 33, 35 are vertically aligned. The first and second sprockets 33, 35 of the first drive assembly 31 are linked by a roller member 34 such as a chain or other linkage device which extends around both sprockets 33, 35. Thus, force from the drive controller 30 will cause both the first and second drive shafts 32, 36 to rotate, thus advancing biomass 15 through the first and second transfer members 50, 52.

As shown in FIG. 1, a second drive assembly 40 may be utilized for embodiments of the present invention which utilize three or more transfer members 50, 52, 54, 56. The second drive assembly 40 will be comprised of a first sprocket 41 and a second sprocket 43 linked by a roller member 42 such as a chain. The first sprocket 41 of the second drive assembly 40 will be fixedly secured to the second drive shaft 36 adjacent the second sprocket 35 of the first drive assembly 31 as shown in FIG. 2. The second sprocket 43 of the second drive assembly 40 will be fixedly secured to the third drive shaft 45 at a position directly above the first sprocket 41 of the second drive assembly 40 such that the sprockets 41, 43 are vertically aligned. The drive controller 30 may linked exclusively to the first drive shaft 32 such that the rotational force is imparted to both the first drive assembly 31 and the second drive assembly 40. In alternate embodiments, the drive controller 30 may be separately linked to both the first and second drive assemblies 31, 40.

As shown in FIG. 1, a third drive assembly 45 may be utilized for embodiments of the present invention which utilize four or more transfer members 50, 52, 54, 56. The third drive assembly 45 will be comprised of a first sprocket 46 and a second sprocket 48 linked by a roller member 47 such as a chain. The first sprocket 46 of the third drive assembly 45 will be fixedly secured to the third drive shaft 44 adjacent the second sprocket 43 of the second drive assembly 40. The second sprocket 48 of the third drive assembly 45 will be fixedly secured to the fourth drive shaft 49 at a position directly above the first sprocket 46 of the third drive assembly 45 such that the sprockets 46, 58 are vertically aligned.

D. Heating Chamber.

The present invention will utilize a heating chamber 60 to heat the biomass 15 as it traverses the transfer members 50, 52, 54, 56. The heating chamber 60 may be comprised of various configurations, but will preferably be comprised of an enclosed, airtight structure having a first side 61 and a second side 62. Each transfer member 50 will extend into the first side 61, through the heating chamber 60 and out the second side 62 as shown in FIG. 2. The heating chamber 60 will also preferably include an exhaust 63.

One or more burner controllers 64 will generally be positioned on the outer surface of the heating chamber 60. The burner controller 64 will be comprised of a structure which ignites gas as it is fed to the burner controller 64 by one or more syngas return lines 66. The burner controller 64 may also be configured to ignite outside sources of gas such as propane for initiating the gasification process of the present invention. It is appreciated that each syngas port 65 may alternatively be linked to a vessel for future use in other applications.

Preferably, each transfer member 50, 52, 54, 56 will include at least one syngas port 65 through which a portion of the syngas produced by the present invention will be rerouted back to the heating chamber 60. Such syngas will be directed through the syngas port 65, through a syngas return line 66 and into the burner controller 64 to be ignited to heat the heating chamber 60 for gasification of biomass 15.

E. Collection Chamber.

The present invention will include a collection chamber 70 for final processing of the biochar 16 produced by the present invention. The collection chamber 70 will generally be linked with the heating chamber 60 by the one or more transfer members 50, 52, 54, 56 as shown in FIG. 2. A biochar cooler 71 may be provided for cooling the biochar 16 prior to being distributed through an outlet 79. An outlet controller 72 may be provided for controlling an outlet drive assembly 73, which drives the processed biochar 16 through the collection chamber 70, biochar cooler 71 and out the outlet 79. The outlet drive assembly 73 may be comprised of a first and second sprocket 76, 77 linked by a roller member 78 as shown in FIG. 2.

F. Operation of Preferred Embodiment.

In use, the hopper 20 and feeder 25 are filled with biomass 15 to be gasified. The biomass 15 may be stored therein while the present invention is not in use. Further, the distance between the heating chamber 60 and the hopper 20 and feeder 25 will prevent biomass 15 stored therein from being prematurely heated or burned.

When ready to use, the drive controller 30 will be activated, which will cause the drive shafts 32, 36, 44, 49 to rotate. The conveying members 51, 53, 55, 57 will convey the biomass 15 through the heating chamber 60 at a set speed. An initial heat source such as propane is directed to the burner controller 64 to provide the initial heat needed for the initial cycles. As biomass 15 traverses the transfer members 50, 52, 54, 56 through the heating chamber 60, the biomass 15 undergoes pyrolysis by baking over the entire length of the heating chamber 60 (as opposed to the burn horizon as with many prior art systems). Because the biomass 15 is baked instead of burned, no tars, oils or ash is present in the final syngas stream or in the produced biochar 16.

Produced syngas may be retrieved through the syngas ports 65 on the transfer members 50, 52, 54, 56 for use in other applications. Further, syngas may be rerouted from the syngas ports 65 back to the burner controller 64 of the heating chamber 60 so as to provide the heat necessary to continue gasification of biomass 15. For example, one syngas port 65 may be routed back to the heating chamber 60 via a syngas return line 66 while three other syngas ports 65 may feed a vessel for use in other applications. By utilizing syngas return lines 66, the operation of the present invention may be self-sustaining after the initial heat is provided by an external source such as propane.

Biochar 16 produced by the present invention will enter the collection chamber 70, where it will be routed through a biochar cooler 71 via the outlet drive assembly 73 prior to being expelled through the outlet 79 for other uses.

Unless otherwise defined, all technical and scientific terms used herein have the same meaning as commonly understood by one of ordinary skill in the art to which this invention belongs. Although methods and materials similar to or equivalent to those described herein can be used in the practice or testing of the present invention, suitable methods and materials are described above. All publications, patent applications, patents, and other references mentioned herein are incorporated by reference in their entirety to the extent allowed by applicable law and regulations. In case of conflict, the present specification, including definitions, will control. The present invention may be embodied in other specific forms without departing from the spirit or essential attributes thereof, and it is therefore desired that the present embodiment be considered in all respects as illustrative and not restrictive. Any headings utilized within the description are for convenience only and have no legal or limiting effect.

The invention claimed is:

1. A mobile horizontal gasifier system, comprising:
   a hopper for storing biomass;
   a feeder fluidly connected to said hopper, wherein said feeder extends vertically downward from said hopper;
   a plurality of transfer members extending into said feeder;
   a heating chamber, wherein each of said one or more transfer members extends through said heating chamber;
   a burner controller for igniting gas entering said heating chamber;
   a collection chamber, wherein each of said one or more transfer members extends into said heating chamber;
   a biochar cooler connected to said collection chamber;
   an outlet drive assembly for conveying biochar through said collection chamber and said biochar cooler;
   one or more biomass drive assemblies for conveying biomass through said one or more transfer members;
   at least one syngas port positioned on each of said at least one transfer members; and
   a syngas return line fluidly connecting said at least one syngas port with said burner controller.

2. The mobile horizontal gasifier system of claim 1, wherein each of said one or more transfer members includes a drive shaft extending therethrough.

3. The mobile horizontal gasifier system of claim 2, wherein said drive shaft includes a conveying member positioned thereon.

4. The mobile horizontal gasifier system of claim 3, wherein said conveying member is comprised of an auger.

5. The mobile horizontal gasifier system of claim 1, wherein said hopper and said feeder are integrally formed of a unitary structure.

6. The mobile horizontal gasifier system of claim 1, further comprising a mobile trailer.

7. The mobile horizontal gasifier system of claim 1, further comprising an outlet connected to said biochar cooler.

8. The mobile horizontal gasifier system of claim 1, wherein each of said one or more drive assemblies is comprised of a first sprocket, a second sprocket and a roller member.

9. A mobile horizontal gasifier system, comprising:
a mobile trailer;
a hopper for storing biomass;
a feeder fluidly connected to said hopper, wherein said feeder extends vertically downward from said hopper;
a plurality of transfer members extending into said feeder, wherein each of said transfer members includes a drive shaft extending therethrough, wherein each of said drive shafts includes an auger positioned thereon;
a heating chamber, wherein each of said one or more transfer members extends through said heating chamber;
a burner controller for igniting gas entering said heating chamber;
a collection chamber, wherein each of said plurality of transfer members extends into said heating chamber;
a biochar cooler connected to said collection chamber;
an outlet drive assembly for conveying biochar through said collection chamber and said biochar cooler;
one or more biomass drive assemblies for conveying biomass through said plurality of transfer members;
at least one syngas port positioned on each of said plurality of transfer members; and
a syngas return line fluidly connecting said at least one syngas port with said burner controller.

10. The mobile horizontal gasifier system of claim 9, wherein said hopper and said feeder are integrally formed of a unitary structure.

11. The mobile horizontal gasifier system of claim 9, further comprising an outlet connected to said biochar cooler.

12. The mobile horizontal gasifier system of claim 9, wherein each of said one or more drive assemblies is comprised of a first sprocket, a second sprocket and a roller member.

13. The mobile horizontal gasifier system of claim 12, wherein said roller member is comprised of a chain.

14. The mobile horizontal gasifier system of claim 9, wherein said one or more drive assemblies is comprised of a first drive assembly, a second drive assembly and a third drive assembly.

15. The mobile horizontal gasifier system of claim 14, wherein said plurality of transfer members is comprised of a first transfer member including a first drive shaft, a second transfer member including a second drive shaft, a third transfer member including a third drive shaft and a fourth transfer member including a fourth drive shaft.

16. The mobile horizontal gasifier system of claim 15, wherein said first drive assembly transfers rotational force to said first drive shaft and said second drive shaft, wherein said second drive assembly transfers rotational force to said second drive shaft and said third drive shaft and wherein said third drive assembly transfers rotational force to said third drive shaft and said fourth drive shaft.

17. A mobile horizontal gasifier system, comprising:
a mobile trailer;
a hopper for storing biomass;
a feeder fluidly connected to said hopper, wherein said feeder extends vertically downward from said hopper;
a first transfer member extending into said feeder, wherein said first transfer member includes a first drive shaft extending therethrough, wherein said first transfer member includes a first auger positioned thereon;
a second transfer member extending into said feeder, wherein said second transfer member includes a second drive shaft extending therethrough, wherein said second transfer member includes a second auger positioned thereon;
a third transfer member extending into said feeder, wherein said third transfer member includes a third drive shaft extending therethrough, wherein said third transfer member includes a third auger positioned thereon;
a fourth transfer member extending into said feeder, wherein said fourth transfer member includes a fourth drive shaft extending therethrough, wherein said fourth transfer member includes a fourth auger positioned thereon;
a heating chamber, wherein each of said transfer members extends through said heating chamber;
a burner controller for igniting gas entering said heating chamber;
a collection chamber, wherein each of said transfer members extends into said heating chamber;
a biochar cooler connected to said collection chamber;
one or more drive assemblies for conveying biomass through said plurality of transfer members, wherein each of said one or more drive assemblies is comprised of a first sprocket, a second sprocket and a chain, wherein said one or more drive assemblies is comprised of a first drive assembly, a second drive assembly and a third drive assembly, wherein said first drive assembly transfers rotational force to said first drive shaft and said second drive shaft, wherein said second drive assembly transfers rotational force to said second drive shaft and said third drive shaft and wherein said third drive assembly transfers rotational force to said third drive shaft and said fourth drive shaft;
at least one syngas port positioned on each of said transfer members; and
a syngas return line fluidly connecting said at least one syngas port with said burner controller.

* * * * *